United States Patent
Chen et al.

(10) Patent No.: US 8,488,088 B2
(45) Date of Patent: Jul. 16, 2013

(54) TRANSFLECTIVE PIXEL STRUCTURE

(75) Inventors: Yu-Mou Chen, Tainan County (TW); Wen-Bin Hsu, Miaoli County (TW); Chih-Yao Chao, Hsinchu (TW); Jin-Ray Wain, Hsinchu County (TW)

(73) Assignee: AU Optronics Corporation, Hsinchu (TW)

( * ) Notice: Subject to any disclaimer, the term of this patent is extended or adjusted under 35 U.S.C. 154(b) by 558 days.

(21) Appl. No.: 12/772,234

(22) Filed: May 3, 2010

(65) Prior Publication Data
US 2011/0199562 A1   Aug. 18, 2011

(30) Foreign Application Priority Data

Feb. 12, 2010   (TW) ................................ 99104806 A (51) Int. Cl.
   *G02F 1/1335*   (2006.01)
(52) U.S. Cl.
   USPC ........................................................ 349/114
(58) Field of Classification Search
   USPC ........................................................ 349/114
   See application file for complete search history.

(56) References Cited

U.S. PATENT DOCUMENTS

| 6,147,722 | A  | * | 11/2000 | Shimada et al. | 349/43 |
| 6,195,140 | B1 | * | 2/2001 | Kubo et al. | 349/44 |
| 6,850,298 | B2 | * | 2/2005 | Fujimori et al. | 349/114 |
| 7,206,047 | B2 |   | 4/2007 | Hwang | |
| 2004/0066364 | A1 | * | 4/2004 | Toyozawa et al. | 345/98 |
| 2004/0075782 | A1 | * | 4/2004 | Ha et al. | 349/43 |
| 2005/0140868 | A1 | * | 6/2005 | Hwang | 349/114 |
| 2005/0174313 | A1 | * | 8/2005 | Kawachi | 345/98 |
| 2008/0043317 | A1 |   | 2/2008 | Hsu et al. | |
| 2008/0062370 | A1 | * | 3/2008 | Park | 349/144 |
| 2008/0151159 | A1 |   | 6/2008 | Kim et al. | |

OTHER PUBLICATIONS

"First Office Action of China Counterpart Application", issued on Dec. 29, 2010, p. 1-p. 4.

* cited by examiner

*Primary Examiner* — Richard Kim
*Assistant Examiner* — Michael Inadomi
(74) *Attorney, Agent, or Firm* — Jinaq Chyun IP Office (57) ABSTRACT

A transflective pixel structure including a reflective region and a transmittance region is provided. The pixel structure includes an active device, a covering layer, a reflective electrode layer, a reflective electrode pattern and a transparent electrode layer. The covering layer is disposed in the reflective region and the transmittance region and covers the active device, where the covering layer has a contact opening at least disposed in the transmittance region. The reflective electrode layer is disposed in the reflective region. The reflective electrode pattern is disposed within the contact opening and extends onto a top surface of the covering layer surrounding the contact opening. The transparent electrode layer is disposed on a surface of the covering layer in the transmittance region. The transparent electrode layer is electrically connected to the reflective electrode layer and the transparent electrode layer is electrically connected to the active device through the contact opening.

17 Claims, 9 Drawing Sheets

TRANSFLECTIVE PIXEL STRUCTURE

CROSS-REFERENCE TO RELATED APPLICATION

This application claims the priority benefit of Taiwan application serial no. 99104806, filed on Feb. 12, 2010. The entirety the above-mentioned patent application is hereby incorporated by reference herein and made a part of specification.

BACKGROUND OF THE INVENTION

1. Field of the Invention

The invention relates to a pixel structure and a pixel structure having memorizing function. More particularly, the invention relates to a transflective pixel structure and a transflective pixel structure having memorizing function.

2. Description of Related Art

In current society, the development of multi-media technologies relies much on the progress of semiconductor devices or display apparatuses. As for displays, LCDs with advantages such as high definition, favorable space utilization, low power consumption and radiation-free operation have gradually become the mainstream of the market. Generally, the LCDs can be classified as transmissive LCDs, reflective LCDs, and transflective LCDs. The transflective LCDs can be used under either sufficient or insufficient illumination, and thus have a wide application scope.

The transflective LCD displays images by using a backlight source and an external light source simultaneously. Generally, the transflective LCD includes a pixel array substrate, an opposite substrate, and a liquid crystal layer sandwiched therebetween. A pixel structure disposed on the pixel array substrate has a transmittance region and a reflective region. Moreover, a transparent pixel electrode is disposed in the transmittance region and a reflective pixel electrode is disposed in the reflective region. The transparent pixel electrode is usually electrically connected to the reflective pixel electrode while the reflective pixel electrode is usually electrically connected to a drain through a contact opening disposed within an insulation layer in the reflective region. However, in conventional technique, in order to lower the power consumption when the LCD is not in operation, memory devices such as static random access memory (SRAM) are usually inserted into the reflective region of each pixel structure. Consequently, the utilizable space in the reflective region of the pixel structure is reduced. Thus, some devices of the transflective pixel structure need to be disposed in the transmittance region. However, it is important to ensure the pixel structure has sufficient transmittance and superior electrical property.

SUMMARY OF THE INVENTION

The invention provides a transflective pixel structure and a transflective pixel structure having memorizing function, where the transflective pixel structures have sufficient transmittance and superior electrical property.

The invention is directed to a transflective pixel structure having a reflective region and a transmittance region. The pixel structure includes an active device, a covering layer, a reflective electrode layer, a reflective electrode pattern, and a transparent electrode layer. The covering layer is disposed in the transmittance region and the reflective region and covers the active device. The covering layer has a contact opening which is at least disposed in the transmittance region. The reflective electrode layer is disposed in the reflective region. The reflective electrode pattern is disposed within the contact opening and extends onto a portion of a top surface of the covering layer surrounding the contact opening. The transparent electrode layer is disposed on a surface of the covering layer in the transmittance region. The transparent electrode layer is electrically connected to the reflective electrode layer. In addition, the transparent electrode layer is electrically connected to the active device through the contact opening.

The invention is further directed to a transflective pixel structure having memorizing function, in which the transflective pixel structure includes a reflective region and a transmittance region. The pixel structure includes an active device, a memory device, a covering layer, a reflective electrode layer, a reflective electrode pattern, and a transparent electrode layer. The active device is disposed in the reflective region. The memory device is disposed in the reflective region and electrically connected to the active device. The covering layer is disposed in the transmittance region and the reflective region and covers the active device and the memory device. The covering layer has a contact opening which is at least disposed in the transmittance region. The reflective electrode layer is disposed in the reflective region. The reflective electrode pattern is disposed within the contact opening and extends onto a portion of a top surface of the covering layer surrounding the contact opening. The transparent electrode layer is disposed on a surface of the covering layer in the transmittance region. The transparent electrode layer is electrically connected to the reflective electrode layer. In addition, the transparent electrode layer is electrically connected to the active device through the contact opening.

Accordingly, in the invention, the contact opening is disposed in the transmittance region, and the reflective electrode pattern is disposed within the contact opening and extends onto the covering layer surrounding the contact opening, so that the transparent electrode layer has better electrical connection with the active device through the reflective electrode pattern within the contact opening. In other words, when the reflective region of the pixel structure has no utilizable space, the pixel structure of the invention has the contact opening disposed in the transmittance region and thus has sufficient transmittance and superior electrical property.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the fabrication of a transflective pixel structure, an insulation layer is first formed in the reflective region and the transmittance region, where the insulation layer has a contact opening disposed in the transmittance region. Next, a reflective pixel electrode material layer is deposited on the insulation layer disposed in the reflective region and the transmittance region. In this step, the reflective pixel electrode material is filled into the contact opening. The reflective pixel electrode material in the transmittance region, including the reflective pixel electrode material in the contact opening, is then removed. A transparent pixel electrode material layer is formed on the insulation layer in the transmittance region, so that the transparent pixel electrode is electrically connected to a drain through the contact opening. Nonetheless, in the foregoing fabrication, since the insulation layer usually has greater thickness (that is, the contact opening has greater depth), the removal of the reflective pixel electrode material in the contact opening is difficult, such that the reflective pixel electrode material is remained in the contact opening. The transparent pixel electrode subsequently formed in the contact opening may be disrupted by the remained reflective pixel electrode material in the contact opening. Therefore, the transparent pixel electrode has broken line problem and the contact resistance between the transparent pixel electrode and the drain is high. The pixel structure illustrated in the following embodiment solves the problem abovementioned.

Figure 1A:
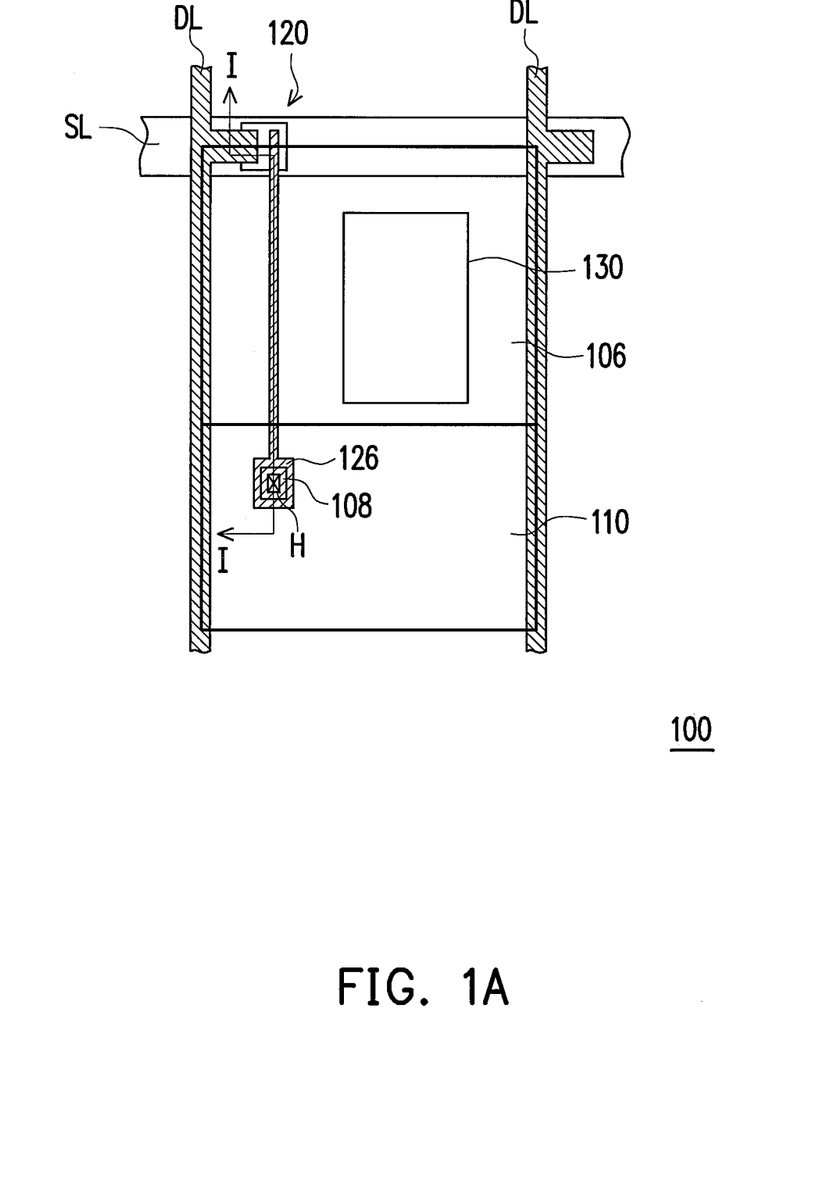
FIG. 1A is a schematic top view of a transflective pixel structure according to an embodiment of the invention.
Figure 1B:
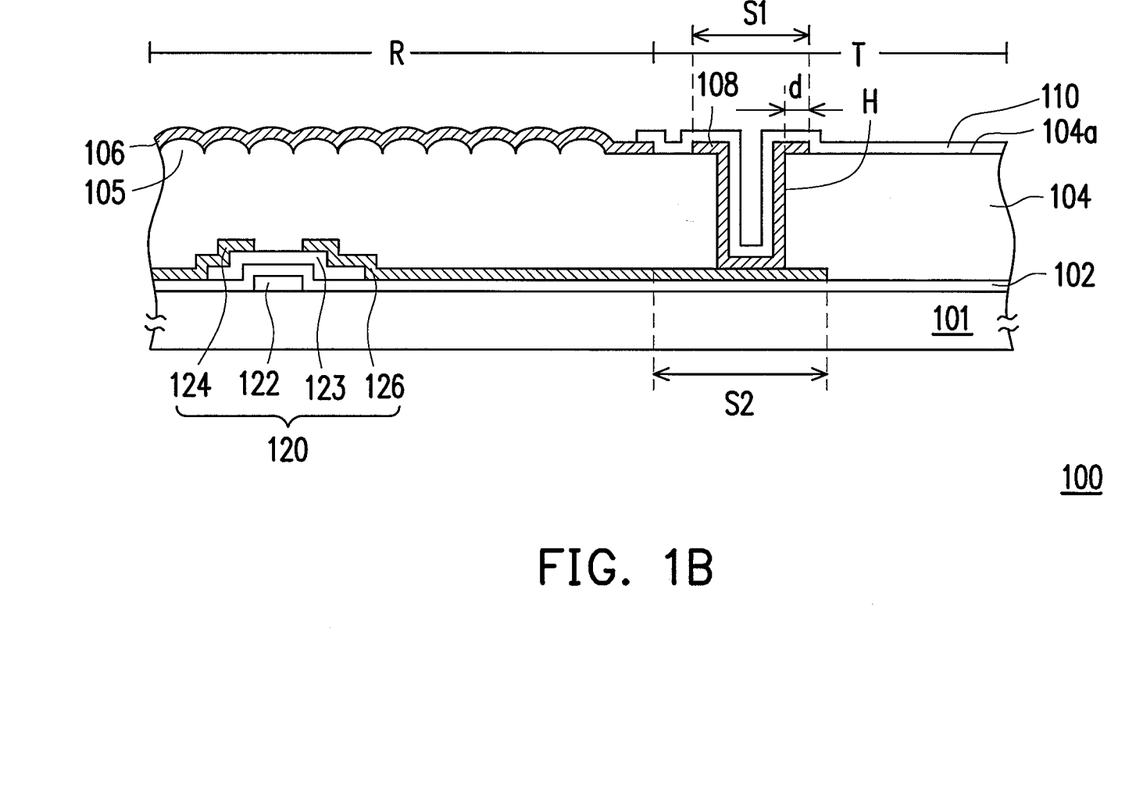
FIG. 1B is a schematic cross-sectional view taken along line I-I' in FIG. 1A.

FIG. 1A is a schematic top view of a transflective pixel structure according to an embodiment of the invention. FIG. 1B is a schematic cross-sectional view taken along line I-I' in FIG. 1A. Referring to FIG. 1A and FIG. 1B, a transflective pixel structure 100 of the present embodiment includes a substrate 101, an active device 120, a covering layer 104, a reflective electrode layer 106, a reflective electrode pattern 108, and a transparent electrode layer 110. Here, the reflective electrode layer 106 and the transparent electrode layer 110 constitute a pixel electrode of the pixel structure 100.

The transflective pixel structure 100 includes a reflective region R and a transmittance region T. The substrate 101 is a glass substrate, a plastic substrate, a silicon substrate, or other suitable substrates, for example. Scan lines SL, data lines DL, and the active device 120 are disposed on the substrate 101. In the present embodiment, the active device 120 is electrically connected to the scan line SL and the data line DL. The active device 120 is a thin film transistor (TFT), for example, and includes a gate 122, a channel layer 123, a source 124, and a drain 126. Since the active device 120 is a light-shielding device, the active device 120 is favorably disposed in the reflective region R. However, in the present embodiment, as the transflective pixel structure 100 further includes a memory device disposed in the reflective region R, the utilizable space in the reflective region R is limited. Thus, the drain 126 of the active device 120 in the present embodiment extends from the reflective region R to the transmittance region T, for example. It should be noted that the memory device 130 is electrically connected to the active device 120, for example, and can have a structure which is designed based on the complex framework of SRAM. This structure can refer to Taiwan Patent Application Number 098135396, the entire disclosures of which is incorporated herein by reference. Next, as indicated in FIG. 1B, a gate insulation layer 102 covering the gate 122 is further disposed on the substrate 101.

The covering layer 104 is disposed on the substrate 101 in the reflective region R and the transmittance region T and covers the active device 120, the scan lines SL, the data lines DL, and the gate insulation layer 102. The covering layer 104 has a contact opening H at least disposed in the transmittance region T and exposing the drain 126. In other words, in the present embodiment, the contact opening H is, for example, disposed in the transmittance region T. However, in another embodiment, the contact opening H is disposed in both of the reflective region R and the transmittance region T (to be described in another embodiment). Herein, the material used for fabricating the covering layer 104 is, for example, a photosensitive organic material. Furthermore, the covering layer 104 has a plurality of protrusion (bumpy or rough) structures 105 in the reflective region R, for example, so as to enhance the reflectivity in the reflective region of the pixel structure. The protrusion structures 105 may be formed by performing a photolithography process. Notably, the material of the covering layer 104 and the formation, shape, density, and location of the protrusion structures 105 are not limited in the invention. The protrusion structures 105 depicted in the drawings are provided merely for better illustration.

The reflective electrode layer 106 is disposed on the covering layer 104 in the reflective region R and thus covers the protrusion structures 105. The reflective electrode layer 106 may be formed by metal, for instance, and favorably using metal material with high reflectivity and conductivity.

The reflective electrode pattern 108 is disposed within the contact opening H and extends onto a portion of a top surface 104a of the covering layer 104 surrounding the contact opening H. In the present embodiment, a distance d between the edge of the contact opening H and the edge of the portion of the top surface 104a of the covering layer 104 surrounding the contact opening H is formed. Specifically, the mentioned portion of the top surface 104a of the covering layer 104 substantially surrounding the contact opening H coincides with the portion of the reflective electrode pattern 108 substantially extending from the edge of the contact opening H to the top surface 104a of the covering layer 104, for example, where 1.5 micrometer (µm)≦d≦2.0 µm. More specifically, in order to prevent the reflective electrode pattern 108 from affecting an aperture ratio of the transflective pixel structure 100, a size S1 of the reflective electrode pattern 108 is favorably designed to be not exceeding a size S2 of the drain 126 in the transmittance region T. Further, in the present embodiment, the reflective electrode pattern 108 is electrically connected to the drain 126 of the active device 120 through the contact opening H, and the reflective electrode layer 106 and the reflective electrode pattern 108 do not contact, for instance. Here, the reflective electrode pattern 108 and the reflective electrode layer 106 are fabricated using the same material and/or in the same step, for instance, and favorably using metal material with high reflectivity and conductivity.

Figure 1C:
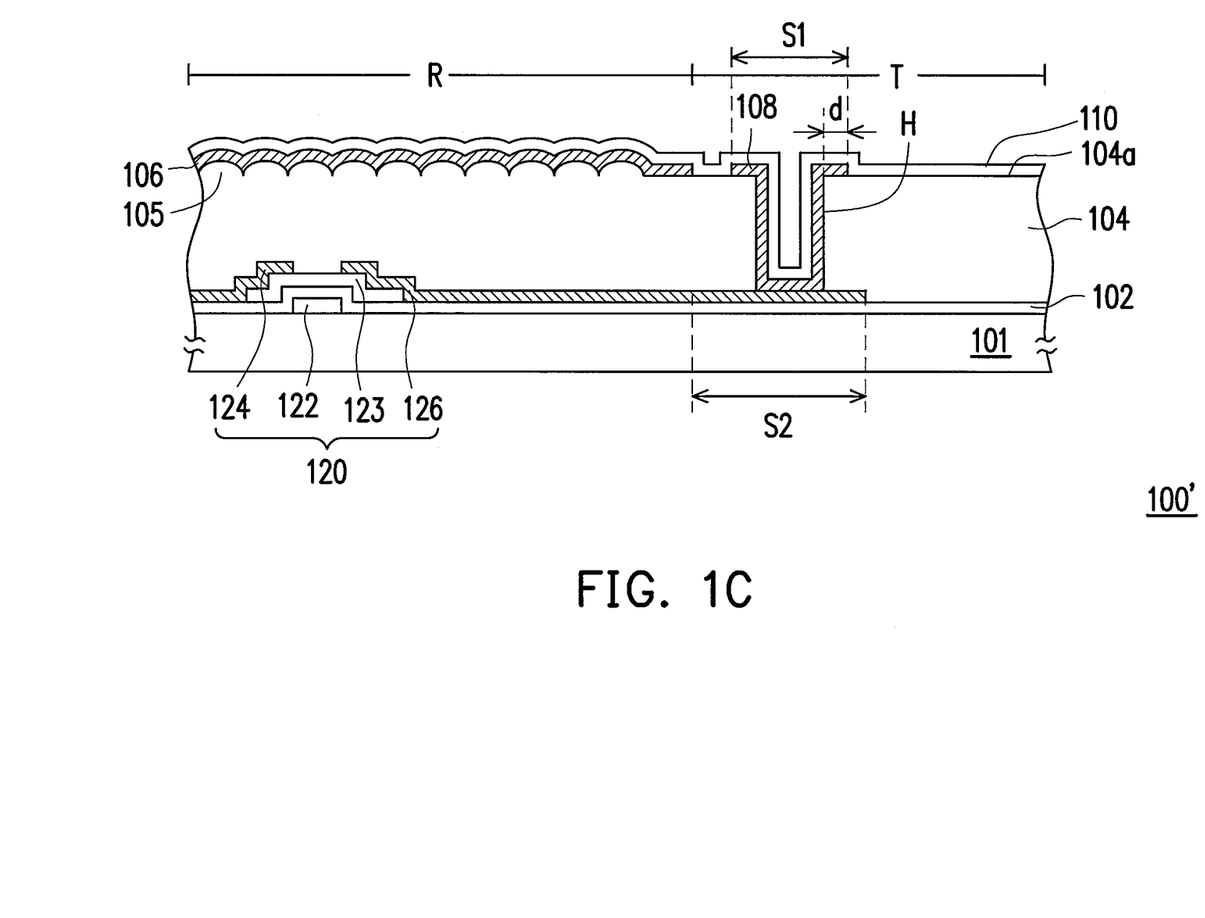
FIG. 1C is a schematic cross-sectional view of a transflective pixel structure according to another embodiment of the invention.

The transparent electrode layer 110 is disposed on the top surface 104a of the covering layer 104 in the transmittance region T. The transparent electrode layer 110 is electrically connected to the reflective electrode layer 106. In addition, the transparent electrode layer 110 is electrically connected to the active device 120 through the contact opening H. In the present embodiment, the transparent electrode layer 110 and the reflective electrode layer 106 are connected, for example. In details, the transparent electrode layer 110 and the active device 120 are electrically connected, and the transparent electrode layer 110 is electrically connected to the reflective electrode layer 106. As a consequence, the reflective electrode layer 106 also electrically connects to the active device 120. Accordingly, the transparent electrode layer 110 and the reflective electrode layer 106 have a common potential when this pixel structure is operated. The transparent electrode layer 110 is fabricated using transparent conductive material, for example, such as indium tin oxide (ITO), indium zinc oxide (IZO), or other metal oxide. In another embodiment, as shown in FIG. 1C, the transparent electrode layer 110 further may completely cover the reflective electrode layer 106 in the reflective region R and/or the reflective electrode pattern 108 to prevent the reflective electrode layer 106 and/or the reflective electrode pattern 108 from peeling off. Although the reflective electrode layer 106 extending onto the scan line SL and the transparent electrode layer 110 extending onto the data line DL are adopted as examples in the present embodiment, the invention does not limit the configuration of the reflective electrode layer 106 and the transparent electrode layer 110. That is, in other embodiments, the reflective electrode layer 106 and the transparent electrode layer 110 are disposed alternatively.

Referring to FIGS. 1A, 1B, and 1C, after an entire layer of reflective electrode material layer is formed on the covering layer 104, the reflective electrode material disposed on the covering layer 104 in the transmittance region T is usually removed, such that only the reflective electrode layer 106 disposed on the covering layer 104 in the reflective region R remains. Nonetheless, in the fabrication of the transflective pixel structure 100 of the present embodiment, the reflective electrode material within the contact opening H and extending onto a portion of the top surface 104a of the covering layer 104 is left to form the reflective electrode pattern 108. In other words, the reflective electrode pattern 108 having a consecutive and complete structure is disposed within the contact opening H. Hence, when the transparent electrode material layer is formed on the covering layer 104 in the transmittance region T, the transparent electrode material layer is not disrupted and capable of covering on the reflective electrode pattern 108 entirely to form the transparent electrode layer 110 without having the broken line problem mentioned above. Thus, the transparent electrode layer 110 is prevented from abnormal breaking. Since the transparent electrode layer 110 has excellent electrical contact with the reflective electrode pattern 108, the transparent electrode layer 110 also has excellent electrical connection with the active device 120. It should be noted that although the transflective pixel structure 100 including the memory device 130 in the reflective region R is used as an example in the present embodiment, the pixel structure can also be adopted in a transflective pixel structure that does not include a memory device. In other words, the transflective pixel structure of the invention can be applied depending on actual circumstances and demands.

Figure 2A:
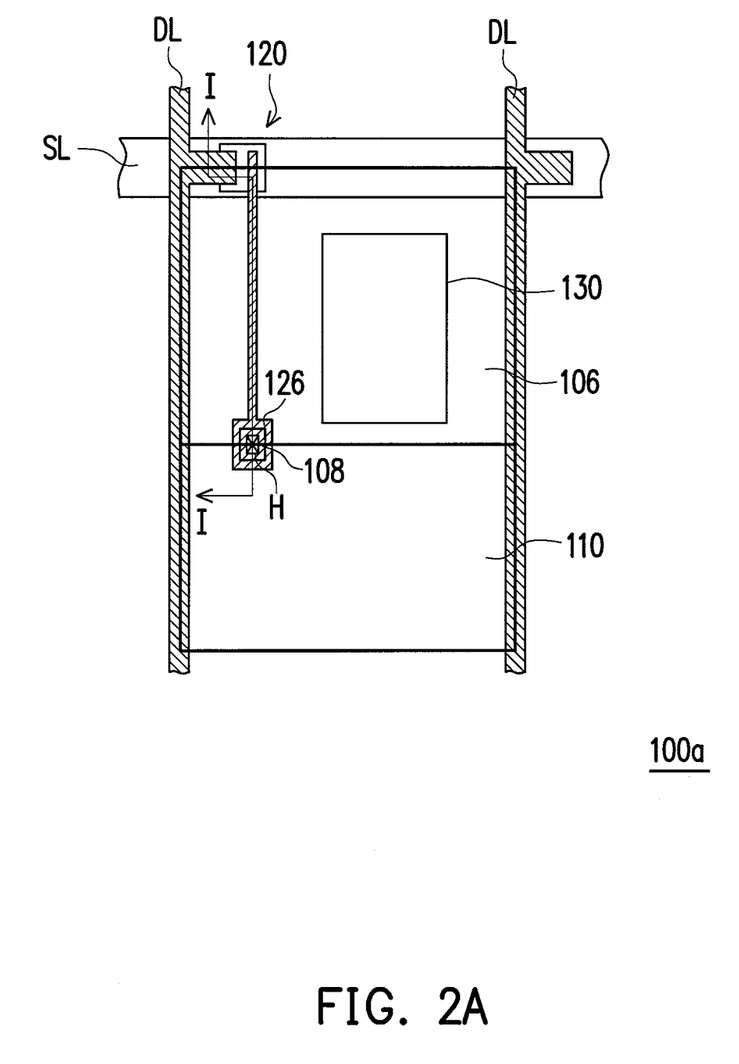
FIG. 2A is a schematic top view of a transflective pixel structure according to another embodiment of the invention.
Figure 2B:
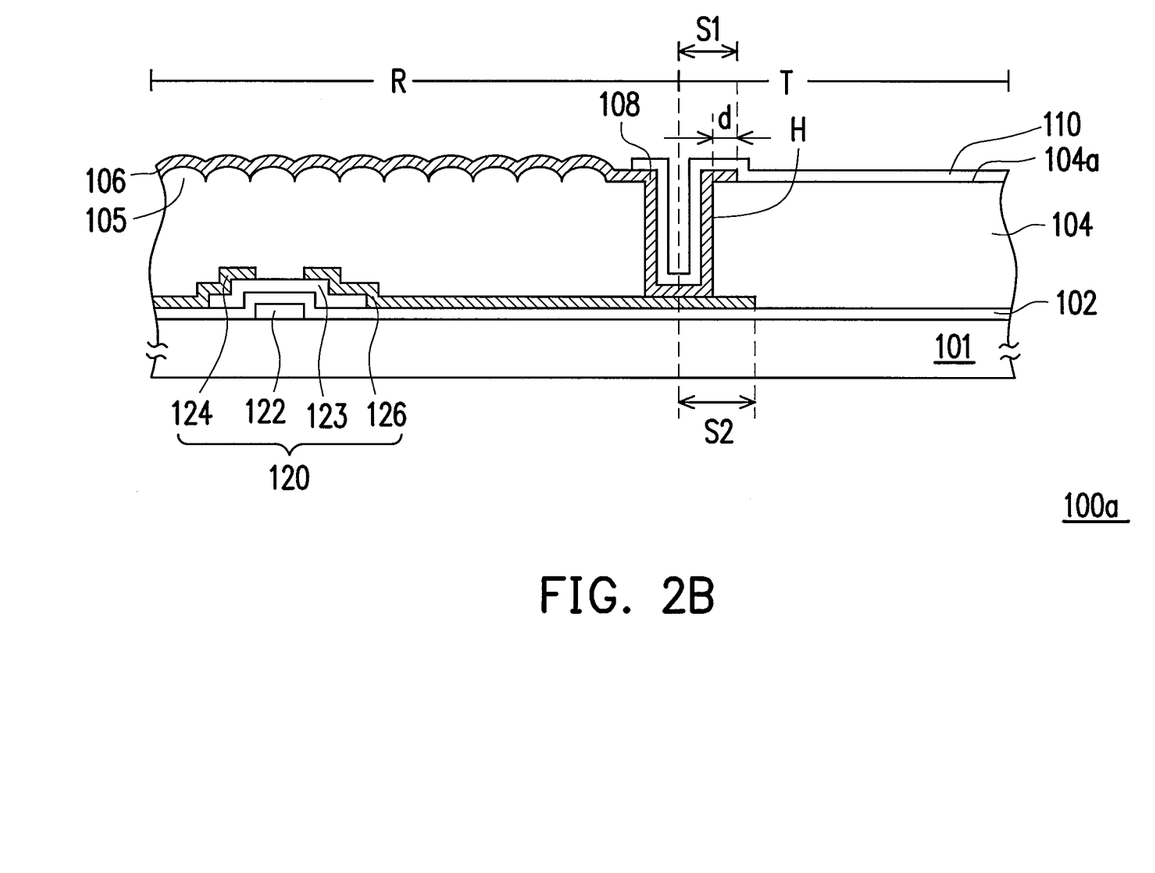
FIG. 2B is a schematic cross-sectional view taken along line I-I' in FIG. 2A.
Figure 2C:
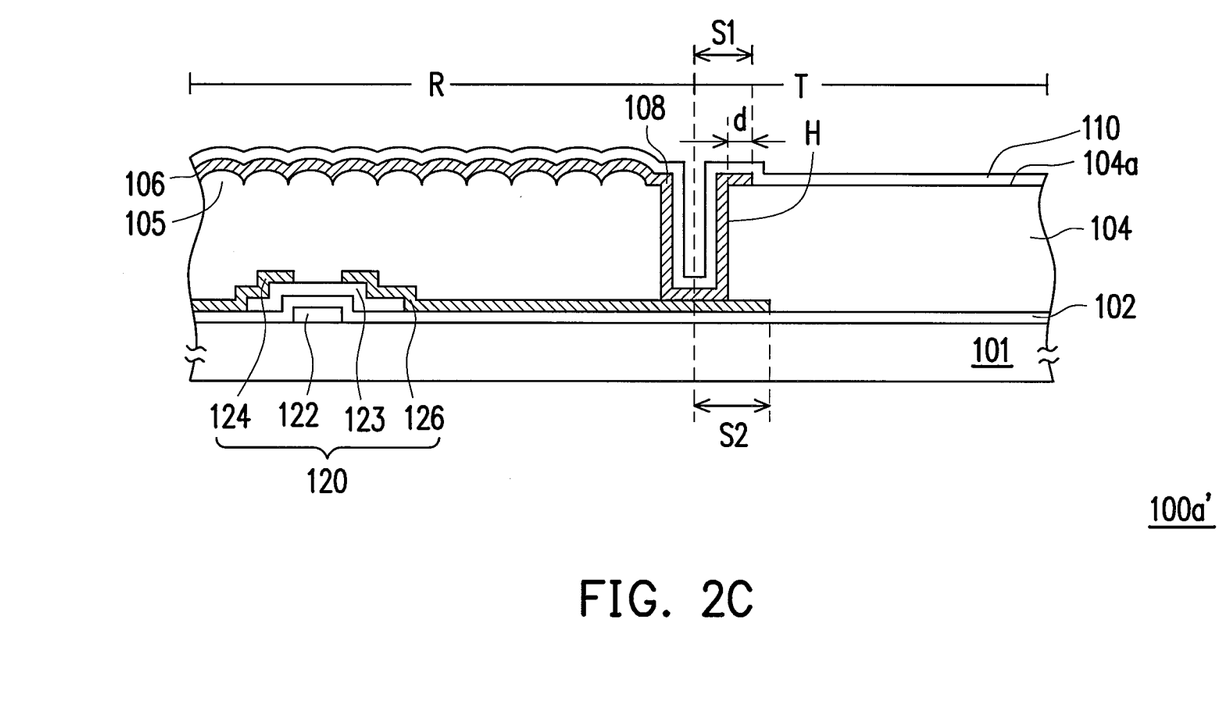
FIG. 2C is a schematic cross-sectional view of a transflective pixel structure according to another embodiment of the invention.

Also, in the foregoing embodiments, the contact opening H is, for example, disposed in the transmittance region T. However, in another embodiment, as shown in FIG. 2A, the contact opening H is disposed in the reflective region R and the transmittance region T simultaneously. Referring to FIGS. 2A and 2B, components and the configuration of a transflective pixel structure 100a are generally identical to those of the transflective pixel structure 100 shown in FIGS. 1A and 1B, and the main difference lies in the position of the contact opening H. Specifically, in the present embodiment, the contact opening H is located at a boundary between the reflective region R and the transmittance region T. The reflective electrode pattern 108 is thus connected to the reflective electrode layer 106 to form into an integrative unit (a single layer), for example. The transparent electrode layer 110 is disposed on the top surface 104a of the covering layer 104 in the transmittance region T. The transparent electrode layer 110 is electrically connected to the reflective electrode layer 106. In addition, the transparent electrode layer 110 is electrically connected to the active device 120 through the contact opening H. In the present embodiment, the distance d between the edge of the contact opening H and the edge of the portion of the top surface 104a of the covering layer 104 surrounding the contact opening H is formed. Specifically, the mentioned portion of the top surface 104a of the covering layer 104 substantially surrounding the contact opening H coincides with the portion of the reflective electrode pattern 108 substantially extending from the edge of the contact opening H to the top surface 104a of the covering layer 104, for example, where $1.5\ \mu m \leq d \leq 2.0\ \mu m$. More specifically, in order to prevent the reflective electrode pattern 108 from affecting the aperture ratio of the transflective pixel structure 100, the size S1 of the reflective electrode pattern 108 is favorably designed to be not exceeding the size S2 of the drain 126 in the transmittance region T. Also, the transparent electrode layer 110 disposed in the transmittance region T is used as an example in the present embodiment. However, in another embodiment, as shown in FIG. 2C, the transparent electrode layer 110 extends from the top surface 104a of the covering layer 104 in the transmittance region T to the top surface of the reflective electrode layer 106 in the reflective region R for covering the reflective electrode layer 106 so as to prevent the material of the reflective electrode layer 106 from peeling off.

Figure 3:
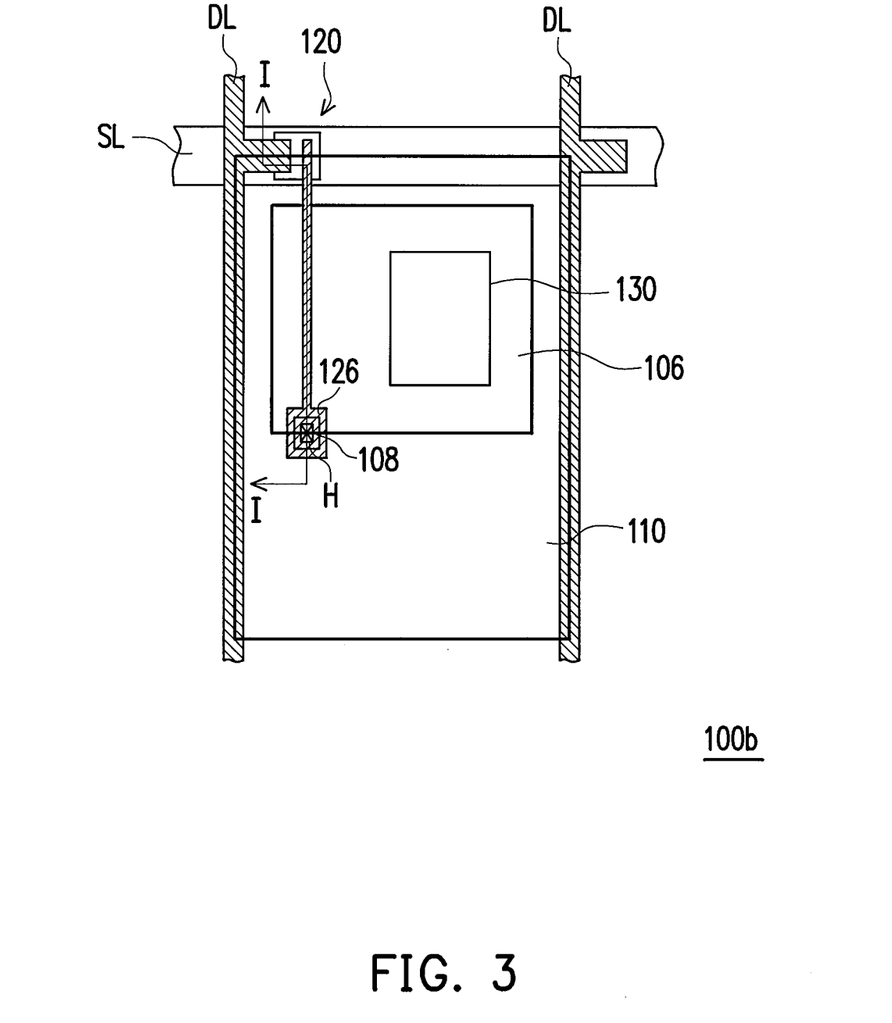
FIG. 3 is a schematic top view of a transflective pixel structure according to an embodiment of the invention.

In the transflective pixel structures aforementioned, the reflective electrode layer 106 and the transparent electrode layer 110 respectively occupy the upper portion and the lower portion of pixel region. Nonetheless, various configurations of the reflective electrode layer 106 and the transparent electrode layer 110 are available in other embodiments. For example, as depicted in FIG. 3, in a transflective pixel structure 100b of an embodiment, a transparent electrode layer 110 surrounds a reflective electrode layer 106, for instance. Moreover, the transparent electrode layer 110 either covers or does not cover the reflective electrode layer 106, for instance. In other words, the reflective electrode layer and the transparent electrode layer in the transflective pixel structure can be disposed in various ways and the ratio occupied by the reflective electrode layer and the transparent electrode layer in the pixel region can be adjusted depending on actual circumstances and demands.

It should be noted that although the foregoing embodiments are illustrated by adopting the transflective pixel structure having a bottom gate type a-Si TFT as an example, the invention is not limited thereto. That is, the invention can also be applied in transflective pixel structures having top gate type a-Si TFTs, top gate type LTPS-TFTs, or bottom gate type LTPS-TFTs. A transflective pixel structure having a top gate type LTPS-TFT is adopted for the following illustration.

Figure 4A:
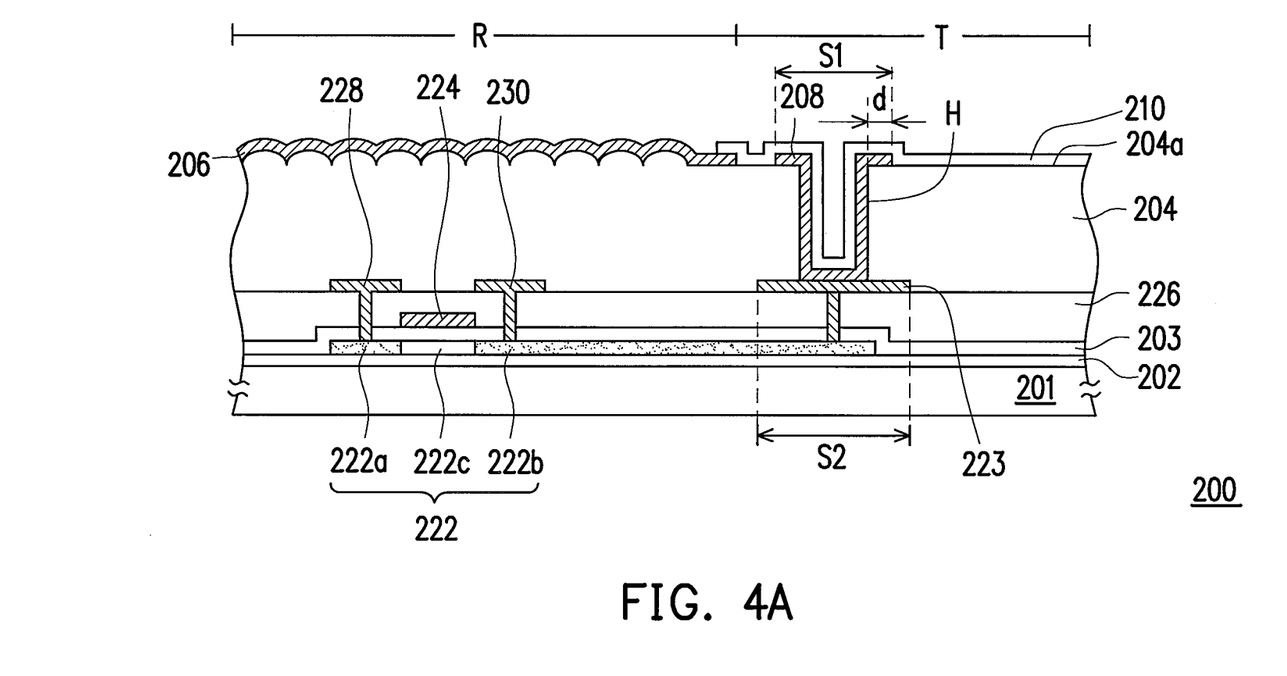
FIG. 4A is a schematic cross-sectional view of a transflective pixel structure according to an embodiment of the invention.

FIG. 4A is a schematic cross-sectional view of a transflective pixel structure according to another embodiment of the invention. Referring to FIG. 4A, a transflective pixel structure 200 of the present embodiment includes a substrate 201, an active device, a covering layer 204, a reflective electrode layer 206, a reflective electrode pattern 208, and a transparent electrode layer 210. The transflective pixel structure 200 includes a reflective region R and a transmittance region T. The substrate 201 is, for example, a glass substrate. The active device is a low temperature poly-silicon thin film transistor structure, for example, and includes a dielectric layer 202, a poly-silicon layer 222, a gate insulation layer 203, a gate 224, a dielectric layer 226, a source layer 228, a drain layer 230, and a patterned conductive layer 223 disposed on the substrate 201 sequentially. Herein, the poly-silicon layer 222 is disposed on the substrate 201 and includes a source region 222a, a drain region 222b, and a channel region 222c located between the source region 222a and a drain region 222b. The source layer 228 is connected to the source region 222a, the drain layer 230 and the patterned conductive layer 223 are connected to the drain region 222b respectively, and the patterned conductive layer 223 is electrically connected to the drain layer 230 through the drain region 222b.

The covering layer 204 is disposed on the substrate 201 in the reflective region R and the transmittance region T, and covers the active device, scan lines (not shown), data lines (not shown), and the dielectric layer 226. The covering layer 204 has a contact opening H disposed in the transmittance region T and exposing the patterned conductive layer 223. The material, structure, and formation of the covering layer 204 can refer to the abovementioned and are thus omitted herein. The reflective electrode layer 206 is disposed on the covering layer 204 in the reflective region R. The reflective electrode pattern 208 is disposed within the contact opening H and extends onto a portion of a top surface 204a of the covering layer 204 surrounding the contact opening H. In the present embodiment, the distance d between the edge of the contact opening H and the edge of the portion of the top surface 204a of the covering layer 204 surrounding the contact opening H is formed. Specifically, the mentioned portion of the top surface 204a of the covering layer 204 substantially surrounding the contact opening H coincides with the portion of the reflective electrode pattern 208 substantially extending from the edge of the contact opening H to the top surface 204a of the covering layer 204, for example, where $1.5\ \mu m \leqq d \leqq 2.0\ \mu m$. More specifically, in order to prevent the reflective electrode pattern 208 from affecting the aperture ratio of the transflective pixel structure 200, the size S1 of the reflective electrode pattern 208 is favorably designed to be not exceeding the size S2 of the patterned conductive layer 223 in the transmittance region T. The transparent electrode layer 210 is disposed on the top surface 204a of the covering layer 204 in the transmittance region T. The transparent electrode layer 210 is electrically connected to the reflective electrode layer 206. In addition, the transparent electrode layer 210 is electrically connected to the patterned conductive layer 223 through the contact opening H so as to be electrically connected to the drain layer 230 of the active device. In the present embodiment, the source layer 228, the drain layer 230, and the patterned conductive layer 223 are formed by patterning the same conductive material layer, for example. Here, the material is a conductive material such as metal or metal oxide. The reflective electrode layer 206 and the reflective electrode pattern 208, for instance, do not contact. The reflective electrode layer 206 and the reflective electrode pattern 208 are fabricated using the same material, for instance, and favorably using metal material with high reflectivity and conductivity. The transparent electrode layer 210 is fabricated, for example, using metal oxide such as ITO, IZO, or other metal oxide, for example. Notably, the reflective electrode layer 206 and the reflective electrode pattern 208 do not contact in the present embodiment. In another embodiment, however, the reflective electrode layer 206 can be connected to the reflective electrode pattern 208 for forming an integrative unit depending on design demands. In another embodiment, as shown in FIG. 4B, the transparent electrode layer 210 further covers the reflective electrode layer 206 in the reflective region R to prevent the reflective electrode layer 206 from peeling off.

Figure 4B:
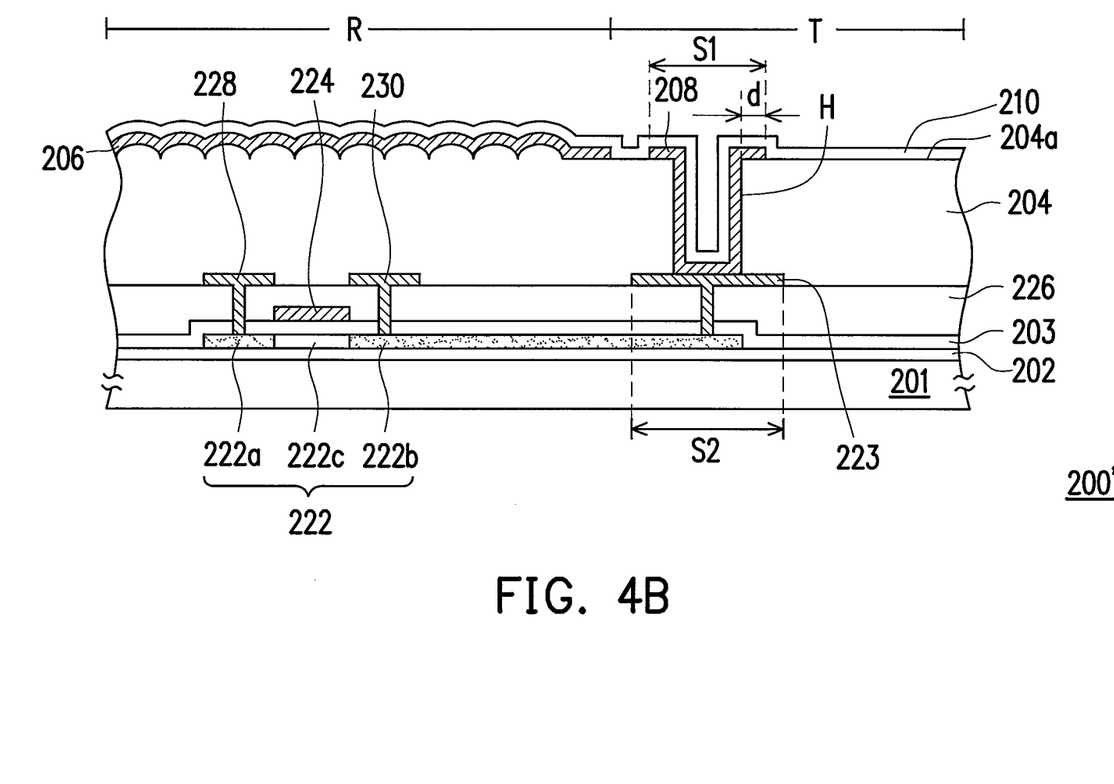
FIG. 4B is a schematic cross-sectional view of a transflective pixel structure according to another embodiment of the invention.

Referring to FIGS. 4A and 4B, after an entire layer of reflective electrode material layer is formed on the covering layer 204, the reflective electrode material disposed on the covering layer 204 in the transmittance region T is usually removed to form the reflective electrode layer 206 disposed on the covering layer 204 in the reflective region R. Nonetheless, in the fabrication of the transflective pixel structure 200 of the present embodiment, the reflective electrode material within the contact opening H and extending onto the top surface 204a of the covering layer 204 is left to form the reflective electrode pattern 208. In other words, the reflective electrode pattern 208 with a consecutive and complete structure is disposed within the contact opening H. Hence, when the transparent electrode material layer is formed on the covering layer 204 in the transmittance region T, the transparent electrode material layer is not disrupted and capable of covering on the reflective electrode pattern 208 entirely to form the transparent electrode layer 210 without having the broken line problem mentioned above. Thus, the transparent electrode layer 210 does not have abnormal line breakage. Since the transparent electrode layer 210 has excellent electrical contact with the reflective electrode pattern 208, the transparent electrode layer 210 also has excellent electrical connection with the active device.

In summary, the reflective electrode pattern is disposed within the contact opening and extends onto the covering layer surrounding the contact opening in the invention, so that the transparent electrode layer has excellent electrical connection with the active device through the reflective electrode pattern within the contact opening. Particularly, since the reflective electrode pattern is a consecutive and complete structure instead of remains resulting from incomplete removal, the transparent electrode layer subsequently formed within the contact opening can cover on the reflective electrode pattern entirely without being disrupted. Therefore, the problem of high contact resistance between the transparent electrode layer and the active device is prevented in the invention.

Practically, the reflective electrode pattern and the reflective electrode layer are formed by the same reflective electrode material layer; thus, only a portion of the reflective electrode material layer has to be removed according to the design so as to form the reflective electrode pattern and the reflective electrode layer. In other words, the transflective pixel structure of the invention is compatible with the current fabrication and additional steps are not required. Furthermore, along with the complication in pixel structures, the number of devices disposed in the reflective region of the pixel structure increases. When the reflective region of the pixel structure has no utilizable space, the pixel structure of the invention has the contact opening disposed in the transmittance region and thus maintains sufficient transmittance and superior electrical property.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A transflective pixel structure having a reflective region and a transmittance region, the transflective pixel structure comprising:
    an active device;
    a covering layer, disposed in the transmittance region and the reflective region and covering the active device, wherein the covering layer has a contact opening at least disposed in the transmittance region;

a reflective electrode layer, disposed in the reflective region;

a reflective electrode pattern, disposed within the contact opening and extending onto a portion of a top surface of the covering layer surrounding the contact opening, wherein the reflective electrode pattern is not directly adjacent to the reflective electrode layer; and a transparent electrode layer, disposed on a surface of the covering layer in the transmittance region, wherein the transparent electrode layer is electrically connected to the reflective electrode layer and the transparent electrode layer is electrically connected to the active device through the contact opening.

2. The transflective pixel structure as claimed in claim 1, wherein a distance between an edge of the contact opening and that of the portion of the top surface of the covering layer surrounding the contact opening is d, where 1.5 micrometer ($\mu m$)$\leq$d$\leq$2.0 $\mu m$.

3. The transflective pixel structure as claimed in claim 1, wherein the transparent electrode layer further covers the reflective electrode layer disposed in the reflective region.

4. The transflective pixel structure as claimed in claim 1, wherein the contact opening is substantially located at a boundary between the reflective region and the transmittance region.

5. The transflective pixel structure as claimed in claim 1, wherein the active device comprises a gate, a source, and a drain, the drain extends from the reflective region to the transmittance region, and the contact opening exposes the drain.

6. The transflective pixel structure as claimed in claim 5, wherein a size of the reflective electrode pattern is not larger than a size of the drain in the transmittance region.

7. The transflective pixel structure as claimed in claim 1, wherein the transparent electrode layer completely covers the reflective electrode pattern.

8. A transflective pixel structure having a memorizing function and including a reflective region and a transmittance region, the transflective pixel structure comprising:

an active device disposed in the reflective region;

a memory device, disposed in the reflective region and electrically connected to the active device;

a covering layer, disposed in the transmittance region and the reflective region and covering the active device and the memory device, wherein the covering layer has a contact opening at least disposed in the transmittance region;

a reflective electrode layer disposed in the reflective region;

a reflective electrode pattern, disposed within the contact opening and extending onto a portion of a top surface of the covering layer surrounding the contact opening, wherein the reflective electrode pattern is not directly adjacent to the reflective electrode layer; and a transparent electrode layer, disposed on a surface of the covering layer in the transmittance region, wherein the transparent electrode layer is electrically connected to the reflective electrode layer and the transparent electrode layer is electrically connected to the active device through the contact opening.

9. The transflective pixel structure having the memorizing function as claimed in claim 8, wherein a distance between an edge of the contact opening and that of the portion of the top surface of the covering layer surrounding the contact opening is d, where 1.5 $\mu m$$\leq$d$\leq$2.0 $\mu m$.

10. The transflective pixel structure having the memorizing function as claimed in claim 8, wherein the transparent electrode layer further covers the reflective electrode layer disposed in the reflective region.

11. The transflective pixel structure having the memorizing function as claimed in claim 8, wherein the contact opening is substantially located at a boundary between the reflective region and the transmittance region.

12. The transflective pixel structure having the memorizing function as claimed in claim 8, wherein the active device comprises a gate, a source, and a drain, the drain extends from the reflective region to the transmittance region and the contact opening exposes the drain.

13. The transflective pixel structure having the memorizing function as claimed in claim 12, wherein a size of the reflective electrode pattern is not larger than a size of the drain in the transmittance region.

14. The transflective pixel structure having the memorizing function as claimed in claim 8, wherein the memory device includes a plurality of thin film transistors (TFTs).

15. The transflective pixel structure having the memorizing function as claimed in claim 8, wherein the transparent electrode layer completely covers the reflective electrode pattern.

16. The transflective pixel structure as claimed in claim 1, wherein the transparent electrode layer contacts and covers a top surface of the reflective electrode pattern and a portion of the transparent electrode layer is located within the contact opening.

17. The transflective pixel structure having the memorizing function as claimed in claim 8, wherein the transparent electrode layer contacts and covers a top surface of the reflective electrode pattern and a portion of the transparent electrode layer is located within the contact opening.

* * * * *